United States Patent
Nguyen et al.

(10) Patent No.: US 7,264,052 B2
(45) Date of Patent: **\*Sep. 4, 2007**

(54) METHODS AND COMPOSITIONS FOR CONSOLIDATING PROPPANT IN FRACTURES

(75) Inventors: Philip D. Nguyen, Duncan, OK (US); Johnny A. Barton, Marlow, OK (US); O. Marlene Isenberg, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 229 days.

This patent is subject to a terminal disclaimer.

(21) Appl. No.: 11/135,566

(22) Filed: May 23, 2005

(65) Prior Publication Data
US 2005/0230111 A1    Oct. 20, 2005

Related U.S. Application Data

(63) Continuation-in-part of application No. 10/383,184, filed on Mar. 6, 2003, now abandoned.

(51) Int. Cl.
*E21B 43/267* (2006.01)
*E21B 33/138* (2006.01)

(52) U.S. Cl. ............ 166/280.2; 166/281; 166/288; 166/295; 166/300; 428/407; 507/219; 507/234; 507/237; 507/247; 507/257; 507/924; 523/131

(58) Field of Classification Search ........ 166/276, 166/280.1, 281, 288, 295, 300; 428/403, 428/405; 507/219, 234, 237, 244, 247, 257, 507/260, 261, 904, 924; 523/131
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Schneider | 260/78.3 |
| 2,869,642 A | 1/1959 | McKay et al. | |
| 3,047,067 A | 7/1962 | Williams et al. | 166/33 |
| 3,123,138 A | 3/1964 | Robichaux | 166/33 |
| 3,176,768 A | 4/1965 | Brandt et al. | 166/33 |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,308,885 A | 3/1967 | Sandiford | 166/33 |
| 3,316,965 A | 5/1967 | Watanabe | 166/33 |
| 3,336,980 A | 8/1967 | Rike | 166/295 |
| 3,375,872 A | 4/1968 | McLaughlin et al. | 166/29 |
| 3,404,735 A | 10/1968 | Young et al. | 166/33 |
| 3,415,320 A | 12/1968 | Young | 166/33 |
| 3,492,147 A | 1/1970 | Young et al. | 117/62.2 |
| 3,659,651 A | 5/1972 | Graham | 166/280 |
| 3,681,287 A | 8/1972 | Brown et al. | 260/67 |
| 3,708,013 A | 1/1973 | Dismuke | 166/276 |
| 3,709,298 A | 1/1973 | Pramann | 166/276 |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,912,692 A | 10/1975 | Casey et al. | 260/78.3 |
| 3,948,672 A | 4/1976 | Harnberger | 106/90 |
| 3,955,993 A | 5/1976 | Curtice | 106/90 |
| 3,960,736 A | 6/1976 | Free et al. | 252/8.55 R |

(Continued)

FOREIGN PATENT DOCUMENTS

CA    2063877    5/2003

(Continued)

OTHER PUBLICATIONS

U.S. Appl. No. 10/383,154, filed Mar. 6, 2003, Nguyen, et al.

(Continued)

*Primary Examiner*—George Suchfield
(74) *Attorney, Agent, or Firm*—Robert A. Kent; Baker Botts

(57) ABSTRACT

Improved methods and compositions for consolidating proppant in subterranean fractures are provided. In certain embodiments, the hardenable resin compositions may be especially suited for consolidating proppant in subterranean fractures having temperatures above about 200° F. Improved methods include providing proppant particles coated with a hardenable resin composition mixed with a gelled liquid fracturing fluid, and introducing the fracturing fluid into a subterranean zone. The fracturing fluid may form one or more fractures in the subterranean zone and deposit the proppant particles coated with the resin composition therein. Thereafter, the hardenable resin composition on the proppant particles is allowed to harden by heat and to consolidate the proppant particles into degradation resistant permeable packs. The hardenable resin composition may include a liquid bisphenol A-epichlorohydrin resin, a 4,4'-diaminodiphenyl sulfone hardening agent, a solvent, a silane coupling agent, and a surfactant. The solvent may include diethylene glycol monomethyl ether or dimethyl sulfoxide.

15 Claims, No Drawings

U.S. PATENT DOCUMENTS

| | | | |
|---|---|---|---|
| 4,008,763 A | 2/1977 | Lowe et al. | 166/253 |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,070,865 A | 1/1978 | McLaughlin | 61/36 C |
| 4,074,760 A | 2/1978 | Copeland et al. | 166/276 |
| 4,127,173 A | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,247,430 A * | 1/1981 | Constien | 523/414 |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstosser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/295 |
| 4,526,695 A | 7/1985 | Erbstosser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,649,998 A | 3/1987 | Friedman | 166/294 |
| 4,664,819 A | 5/1987 | Glaze et al. | 252/8.551 |
| 4,665,988 A * | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstosser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,105,886 A | 4/1992 | Strubhar | 166/280 |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredickson | 166/307 |
| 5,247,059 A | 9/1993 | Gruber et al. | 528/354 |
| 5,249,628 A | 10/1993 | Surjaatmadia | 166/305 |
| 5,256,729 A | 10/1993 | Kutts et al. | 524/700 |
| 5,273,115 A | 12/1993 | Spafford | 166/281 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmadja et al. | 175/67 |
| 5,363,916 A | 11/1994 | Himes et al. | 166/276 |
| 5,373,901 A | 12/1994 | Norman et al. | 166/300 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |

| Patent No. | Date | Inventor | Class |
|---|---|---|---|
| 5,551,513 A | 9/1996 | Surles et al. ............... 166/278 |
| 5,551,514 A | 9/1996 | Nelson et al. ............... 166/280 |
| 5,582,249 A | 12/1996 | Caveny et al. ............... 166/276 |
| 5,582,250 A | 12/1996 | Constien ..................... 166/280 |
| 5,588,488 A | 12/1996 | Vijn et al. ................... 166/293 |
| 5,591,700 A | 1/1997 | Harris et al. ................ 507/204 |
| 5,594,095 A | 1/1997 | Gruber et al. ............... 528/354 |
| 5,595,245 A | 1/1997 | Scott, III .................. 166/250.1 |
| 5,597,784 A | 1/1997 | Sinclair et al. .............. 507/269 |
| 5,604,184 A | 2/1997 | Ellis et al. ................... 507/117 |
| 5,604,186 A | 2/1997 | Hunt et al. .................. 507/204 |
| 5,609,207 A | 3/1997 | Dewprashad et al. ........ 166/276 |
| 5,620,049 A | 4/1997 | Gipson et al. ............... 166/248 |
| 5,639,806 A | 6/1997 | Johnson et al. .............. 523/208 |
| 5,670,473 A | 9/1997 | Scepanski .................... 510/445 |
| 5,697,440 A | 12/1997 | Weaver et al. ............... 166/281 |
| 5,698,322 A | 12/1997 | Tsai et al. .................... 428/373 |
| 5,712,314 A | 1/1998 | Surles et al. .................. 521/41 |
| 5,732,364 A | 3/1998 | Kalb et al. ...................... 588/8 |
| 5,765,642 A | 6/1998 | Surjaatmadja ............... 166/297 |
| 5,775,425 A | 7/1998 | Weaver et al. ............... 166/276 |
| 5,782,300 A | 7/1998 | James et al. ................. 166/278 |
| 5,783,822 A | 7/1998 | Buchanan et al. ............ 250/259 |
| 5,787,986 A | 8/1998 | Weaver et al. ............... 166/276 |
| 5,791,415 A | 8/1998 | Nguyen et al. ............... 166/280 |
| 5,799,734 A | 9/1998 | Norman et al. ............... 166/278 |
| 5,806,593 A | 9/1998 | Suries ........................ 166/270 |
| 5,830,987 A | 11/1998 | Smith .......................... 528/332 |
| 5,833,000 A | 11/1998 | Weaver et al. ............... 166/276 |
| 5,833,361 A | 11/1998 | Funk ............................. 366/80 |
| 5,836,391 A | 11/1998 | Jonasson et al. ............. 166/295 |
| 5,836,392 A | 11/1998 | Urlwin-Smith ............... 166/295 |
| 5,837,656 A | 11/1998 | Sinclair et al. ............... 507/220 |
| 5,837,785 A | 11/1998 | Kinsho et al. ................ 525/527 |
| 5,839,510 A | 11/1998 | Weaver et al. ............... 166/276 |
| 5,840,784 A | 11/1998 | Funkhouser et al. ......... 523/130 |
| 5,849,401 A | 12/1998 | El-Afandi et al. ........... 428/218 |
| 5,849,590 A | 12/1998 | Anderson, II et al. ......... 436/27 |
| 5,853,048 A | 12/1998 | Weaver et al. ............... 166/279 |
| 5,864,003 A | 1/1999 | Qureshi et al. ............... 528/141 |
| 5,865,936 A | 2/1999 | Edelman et al. ............. 156/310 |
| 5,871,049 A | 2/1999 | Weaver et al. ............... 166/276 |
| 5,873,413 A | 2/1999 | Chatterji et al. .............. 166/293 |
| 5,875,844 A | 3/1999 | Chatterji et al. .............. 166/276 |
| 5,875,845 A | 3/1999 | Chatterji et al. .............. 166/293 |
| 5,875,846 A | 3/1999 | Chatterji et al. .............. 166/293 |
| 5,893,383 A | 4/1999 | Fracteau ........................ 137/14 |
| 5,893,416 A | 4/1999 | Read ........................... 166/304 |
| 5,908,073 A | 6/1999 | Nguyen et al. ............... 166/276 |
| 5,911,282 A | 6/1999 | Onan et al. ..................... 175/72 |
| 5,916,933 A | 6/1999 | Johnson et al. .............. 523/208 |
| 5,921,317 A | 7/1999 | Dewprashad et al. ........ 166/208 |
| 5,924,488 A | 7/1999 | Nguyen et al. ............... 166/280 |
| 5,929,437 A | 7/1999 | Elliott et al. ................. 250/259 |
| 5,944,105 A | 8/1999 | Nguyen ........................ 166/278 |
| 5,945,387 A | 8/1999 | Chatterji et al. .............. 507/224 |
| 5,948,734 A | 9/1999 | Sinclair et al. ............... 507/219 |
| 5,957,204 A | 9/1999 | Chatterji et al. .............. 166/295 |
| 5,960,877 A | 10/1999 | Funkhouser et al. ......... 166/270 |
| 5,960,880 A | 10/1999 | Nguyen et al. ............... 166/280 |
| 5,964,291 A | 10/1999 | Bourne et al. ................ 166/279 |
| 5,969,006 A | 10/1999 | Onan et al. ................... 523/166 |
| 5,977,283 A | 11/1999 | Rossitto ......................... 528/44 |
| 5,994,785 A | 11/1999 | Higuchi et al. .............. 527/789 |
| RE36,466 E | 12/1999 | Nelson et al. ............... 166/280 |
| 6,003,600 A | 12/1999 | Nguyen et al. ............... 166/281 |
| 6,004,400 A | 12/1999 | Bishop et al. .................. 134/2 |
| 6,006,835 A | 12/1999 | Onan et al. ................... 166/295 |
| 6,006,836 A | 12/1999 | Chatterji et al. .............. 166/295 |
| 6,012,524 A | 1/2000 | Chatterji et al. .............. 166/295 |
| 6,016,870 A | 1/2000 | Dewprashad et al. ........ 166/295 |
| 6,024,170 A | 2/2000 | McCabe et al. .............. 166/300 |
| 6,028,113 A | 2/2000 | Scepanski .................... 514/643 |
| 6,028,534 A | 2/2000 | Ciglenec et al. ......... 340/856.2 |
| 6,040,398 A | 3/2000 | Kinsho et al. ............... 528/527 |
| 6,047,772 A | 4/2000 | Weaver et al. ............... 166/276 |
| 6,059,034 A | 5/2000 | Rickards et al. .............. 166/280 |
| 6,059,035 A | 5/2000 | Chatterji et al. .............. 166/293 |
| 6,059,036 A | 5/2000 | Chatterji et al. .............. 166/294 |
| 6,068,055 A | 5/2000 | Chatterji et al. .............. 166/293 |
| 6,069,117 A | 5/2000 | Onan et al. ................... 507/202 |
| 6,074,739 A | 6/2000 | Katagiri ....................... 428/323 |
| 6,079,492 A | 6/2000 | Hoogteijling et al. ........ 166/276 |
| 6,098,711 A | 8/2000 | Chatterji et al. .............. 166/294 |
| 6,114,410 A | 9/2000 | Betzold ........................ 523/130 |
| 6,123,871 A | 9/2000 | Carroll ..................... 252/301.36 |
| 6,123,965 A | 9/2000 | Jacon et al. .................. 424/489 |
| 6,124,246 A | 9/2000 | Heathman et al. ........... 507/219 |
| 6,130,286 A | 10/2000 | Thomas et al. .............. 524/507 |
| 6,135,987 A | 10/2000 | Tsai et al. .................... 604/365 |
| 6,140,446 A | 10/2000 | Fujiki et al. ................... 528/15 |
| 6,148,911 A | 11/2000 | Gipson et al. ............... 166/248 |
| 6,152,234 A | 11/2000 | Newhouse et al. ........... 166/403 |
| 6,162,766 A | 12/2000 | Muir et al. ................... 507/267 |
| 6,169,058 B1 | 1/2001 | Le et al. ....................... 507/222 |
| 6,172,011 B1 | 1/2001 | Card et al. ................... 507/204 |
| 6,172,077 B1 | 1/2001 | Curtis et al. ................. 514/279 |
| 6,176,315 B1 | 1/2001 | Reddy et al. ................. 166/295 |
| 6,177,484 B1 | 1/2001 | Surles .......................... 523/131 |
| 6,184,311 B1 | 2/2001 | O'Keefe et al. .............. 525/438 |
| 6,187,834 B1 | 2/2001 | Thayer et al. .................. 522/15 |
| 6,187,839 B1 | 2/2001 | Eoff et al. .................... 523/130 |
| 6,189,615 B1 | 2/2001 | Sydansk ...................... 166/270 |
| 6,192,985 B1 | 2/2001 | Hinkel et al. ................ 166/280 |
| 6,192,986 B1 | 2/2001 | Urlwin-Smith ............... 166/295 |
| 6,196,317 B1 | 3/2001 | Hardy .......................... 166/295 |
| 6,202,751 B1 | 3/2001 | Chatterji et al. .............. 166/276 |
| 6,209,643 B1 | 4/2001 | Nguyen et al. ............... 166/276 |
| 6,209,644 B1 | 4/2001 | Brunet ......................... 166/297 |
| 6,209,646 B1 | 4/2001 | Reddy et al. ................. 166/300 |
| 6,210,471 B1 | 4/2001 | Craig ........................ 106/31.08 |
| 6,214,773 B1 | 4/2001 | Harris et al. ................. 507/271 |
| 6,231,664 B1 | 5/2001 | Chatterji et al. .............. 106/724 |
| 6,234,251 B1 | 5/2001 | Chatterji et al. .............. 166/295 |
| 6,238,597 B1 | 5/2001 | Yim et al. .................... 252/512 |
| 6,241,019 B1 | 6/2001 | Davidson et al. ............ 166/249 |
| 6,242,390 B1 | 6/2001 | Mitchell et al. .............. 507/211 |
| 6,244,344 B1 | 6/2001 | Chatterji et al. .............. 166/295 |
| 6,257,335 B1 | 7/2001 | Nguyen et al. ............... 166/280 |
| 6,260,622 B1 | 7/2001 | Blok et al. ................. 166/305.1 |
| 6,271,181 B1 | 8/2001 | Chatterji et al. .............. 507/219 |
| 6,274,650 B1 | 8/2001 | Cui .............................. 523/457 |
| 6,279,652 B1 | 8/2001 | Chatterji et al. .............. 166/194 |
| 6,279,656 B1 | 8/2001 | Sinclair et al. ............... 166/310 |
| 6,283,214 B1 | 9/2001 | Guinot et al. ................ 166/297 |
| 6,302,207 B1 | 10/2001 | Nguyen et al. ............... 166/276 |
| 6,306,998 B1 | 10/2001 | Kimura et al. ................. 528/12 |
| 6,311,773 B1 | 11/2001 | Todd et al. ................... 166/280 |
| 6,321,841 B1 | 11/2001 | Eoff et al. .................... 166/291 |
| 6,323,307 B1 | 11/2001 | Bigg et al. ................... 528/354 |
| 6,326,458 B1 | 12/2001 | Gruber et al. ................ 528/354 |
| 6,328,105 B1 | 12/2001 | Betzold ........................ 166/280 |
| 6,328,106 B1 | 12/2001 | Griffith et al. ................ 166/295 |
| 6,330,916 B1 | 12/2001 | Rickards et al. .............. 166/280 |
| 6,330,917 B2 | 12/2001 | Chatterji et al. .............. 166/295 |
| 6,350,309 B2 | 2/2002 | Chatterji et al. .............. 106/677 |
| 6,357,527 B1 | 3/2002 | Norman et al. .............. 166/300 |
| 6,364,018 B1 | 4/2002 | Brannon et al. ........... 166/280.2 |
| 6,364,945 B1 | 4/2002 | Chatterji et al. .............. 106/677 |
| 6,367,165 B1 | 4/2002 | Huttlin ........................... 34/582 |
| 6,367,549 B1 | 4/2002 | Chatterji et al. .............. 166/292 |
| 6,372,678 B1 | 4/2002 | Youngsman et al. ......... 504/128 |
| 6,376,571 B1 | 4/2002 | Chawla et al. ................. 522/64 |
| 6,387,986 B1 | 5/2002 | Moradi-Araghi et al. ... 523/211 |
| 6,390,195 B1 | 5/2002 | Nguyen et al. ............... 166/276 |
| 6,401,817 B1 | 6/2002 | Griffith et al. ................ 166/295 |

| | | | |
|---|---|---|---|
| 6,405,797 B2 | 6/2002 | Davidson et al. | 166/249 |
| 6,406,789 B1 | 6/2002 | McDaniel et al. | 428/403 |
| 6,408,943 B1 | 6/2002 | Schultz et al. | 166/285 |
| 6,422,314 B1 | 7/2002 | Todd et al. | 166/312 |
| 6,439,309 B1 | 8/2002 | Matherly et al. | 166/276 |
| 6,439,310 B1 | 8/2002 | Scott, III et al. | 166/308 |
| 6,440,255 B1 | 8/2002 | Kohlhammer et al. | 156/283 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/370 |
| 6,458,885 B1 | 10/2002 | Stengal et al. | 524/507 |
| 6,485,947 B1 | 11/2002 | Rajgarhia et al. | 435/139 |
| 6,488,091 B1 | 12/2002 | Weaver et al. | 166/300 |
| 6,488,763 B2 | 12/2002 | Brothers et al. | 106/692 |
| 6,494,263 B2 | 12/2002 | Todd | 166/312 |
| 6,503,870 B2 | 1/2003 | Griffith et al. | 507/219 |
| 6,508,305 B1 | 1/2003 | Brannon et al. | 166/293 |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,538,576 B1 | 3/2003 | Schultz et al. | 340/859.6 |
| 6,543,545 B1 | 4/2003 | Chatterji et al. | 166/381 |
| 6,552,333 B1 | 4/2003 | Storm et al. | 250/269.3 |
| 6,554,071 B1 | 4/2003 | Reddy et al. | 166/293 |
| 6,555,507 B2 | 4/2003 | Chatterji et al. | 507/219 |
| 6,569,814 B1 | 5/2003 | Brady et al. | 507/201 |
| 6,582,819 B2 | 6/2003 | McDaniel et al. | 428/402 |
| 6,593,402 B2 | 7/2003 | Chatterji et al. | 524/7 |
| 6,599,863 B1 | 7/2003 | Palmer et al. | 507/219 |
| 6,608,162 B1 | 8/2003 | Chiu et al. | 528/129 |
| 6,616,320 B2 | 9/2003 | Huber et al. | 366/156.2 |
| 6,620,857 B2 | 9/2003 | Valet | 522/42 |
| 6,626,241 B2 | 9/2003 | Nguyen | 166/278 |
| 6,632,527 B1 | 10/2003 | McDaniel et al. | 428/402 |
| 6,632,892 B2 | 10/2003 | Rubinsztajn et al. | 525/476 |
| 6,642,309 B2 | 11/2003 | Komitsu et al. | 525/100 |
| 6,648,501 B2 | 11/2003 | Huber et al. | 366/301 |
| 6,659,179 B2 | 12/2003 | Nguyen | 166/227 |
| 6,664,343 B2 | 12/2003 | Narisawa et al. | 525/474 |
| 6,667,279 B1 | 12/2003 | Hessert et al. | 507/225 |
| 6,668,926 B2 | 12/2003 | Nguyen et al. | 166/280 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nguyen et al. | 166/281 |
| 6,710,019 B1 | 3/2004 | Sawdon et al. | 507/136 |
| 6,713,170 B1 | 3/2004 | Kaneka et al. | 428/323 |
| 6,725,926 B2 | 4/2004 | Nguyen et al. | 166/254.1 |
| 6,725,931 B2 | 4/2004 | Nguyen et al. | 166/280.2 |
| 6,729,404 B2 * | 5/2004 | Nguyen et al. | 166/280.2 |
| 6,732,800 B2 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B2 | 7/2004 | Nguyen et al. | 166/300 |
| 6,776,236 B1 | 8/2004 | Nguyen | 166/279 |
| 6,832,650 B2 | 12/2004 | Nguyen et al. | 166/279 |
| 6,851,474 B2 | 2/2005 | Nguyen | 166/276 |
| 6,887,834 B2 | 5/2005 | Nguyen et al. | 507/221 |
| 6,978,836 B2 | 12/2005 | Nguyen et al. | 166/295 |
| 7,059,406 B2 * | 6/2006 | Nguyen | 166/281 |
| 2001/0016562 A1 | 8/2001 | Muir et al. | 507/201 |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2003/0006036 A1 | 1/2003 | Malone et al. | 166/250.12 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | 166/280 |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040713 A1 | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen | 166/280.2 |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 * | 10/2004 | Nguyen et al. | 166/281 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/281 |
| 2005/0000731 A1 | 1/2005 | Nguyen et al. | 175/57 |
| 2005/0006093 A1 | 1/2005 | Nguyen | 166/281 |
| 2005/0006095 A1 | 1/2005 | Justus et al. | 166/295 |
| 2005/0006096 A1 | 1/2005 | Nguyen et al. | 166/295 |
| 2005/0034862 A1 * | 2/2005 | Nguyen | 166/280.2 |
| 2005/0045326 A1 | 3/2005 | Nguyen | 166/278 |

FOREIGN PATENT DOCUMENTS

| | | |
|---|---|---|
| EP | 0 313 243 A2 | 10/1988 |
| EP | 0 528 595 A1 | 8/1992 |
| EP | 0510762 A2 | 11/1992 |
| EP | 0 643 196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1292718 | 10/1972 |
| GB | 2382143 A | 4/2001 |
| WO | WO93/15127 | 8/1993 |
| WO | WO94/07949 | 4/1994 |
| WO | WO94/08078 | 4/1994 |
| WO | WO94/08090 | 4/1994 |
| WO | WO95/09879 | 4/1995 |
| WO | WO97/11845 | 4/1997 |
| WO | WO99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 | 4/2003 |
| WO | WO 2004/037946 A1 | 5/2004 |
| WO | WO 2004/038176 A1 | 5/2004 |

WO  WO 2005/021928 A2   3/2005

OTHER PUBLICATIONS

U.S. Appl. No. 10/394,898, filed Mar. 21, 2003, Eoff et al.
U.S. Appl. No. 10/408,800, filed Apr. 7, 2003, Nguyen, et al.
U.S. Appl. No. 10/601,407, filed Jun. 23, 2003, Byrd et al.
U.S. Appl. No. 10/603,492, filed Jun. 25, 2003, Nguyen, et al.
U.S. Appl. No. 10/727,365, filed Dec. 4, 2003, Reddy, et al.
U.S. Appl. No. 10/853,879, filed May 26, 2004, Nguyen et al.
Halliburton Technical Flier—Multi Stage Frac Completion Methods, 2 pages.
Halliburton "CobraFrac$^{SM}$ Service, Coiled Tubing Fracturing—Cost-Effective Method for Stimulating Untapped Reserves", 2 pages, 2004.
Halliburton "CobraJetFrac$^{SM}$ Service, Cost-Effective Technology That Can Help Reduce Cost per BOE Produced, Shorten Cycle time and Reduce Capex".
Halliburton Cobra Frac Advertisment, 2001.
Halliburton "SurgiFrac$^{SM}$ Service, a Quick and cost-Effective Method to Help Boost Production From Openhole Horizonal Completions", 2002.
Nguyen et al., A Novel Approach For Enhancing Proppant Consolidation: Laboratory Testing And Field Applications, SPE Paper No. 77748, 2002.
SPE 15547, Field Application of Lignosulfonate Gels To Reduce Channeling, South Swan Hills Miscible Unit, Alberta, Canada, by O.R. Wagner et al, 1986.
Owens et al., Waterflood Pressure Pulsing for Fractured Reservoirs SPE 1123, 1966.
Felsenthal et al., Pressure Pulsing—An Improved Method of Waterflooding Fractured Reservoirs SPE 1788, 1957.
Raza, "Water and Gas Cyclic Pulsing Method for Improved Oil Recovery", SPE 3005, 1971.
Peng et al., "Pressure Pulsing Waterflooding in Dual Porosity Naturally Fractured Reservoirs" SPE 17587, 1988.
Dusseault et al., "Pressure Pulse Workovers in Heavy Oil", SPE 79033, 2002.
Yang et al., "Experimental Study on Fracture Initiation By Pressure Pulse", SPE 63035, 2000.
Nguyen et al., New Guidelines For Applying Curable Resin-Coated Proppants, SPE Paper No. 39582, 1997.
Kazakov et al., "Optimizing and Managing Coiled Tubing Frac Strings" SPE 60747, 2000.
Advances in Polymer Science, vol. 157, "Degradable Aliphatic Polyesters" edited by A.-C. Alberston, 2001.
Gorman, Plastic Electric: Lining up the Future of Conducting Polymers Science News, vol. 163, May 17, 2003.
Gidley et al., "Recent Advances in Hydraulic Fracturing," Chapter 6, pp. 109-130, 1989.
Simmons et al., "Poly(phenyllactide): Synthesis, Characterization, and Hydrolytic Degradation, Biomacromolecules", vol. 2, No. 2, pp. 658-663, 2001.
Yin et al., "Preparation and Characterization of Substituted Polylactides", Americal Chemical Society, vol. 32, No. 23, pp. 7711-7718, 1999.
Yin et al., "Synthesis and Properties of Polymers Derived from Substituted Lactic Acids", American Chemical Society, Ch. 12, pp. 147-159, 2001.
Cantu et al., "Laboratory and Field Evaluation of a Combined Fluid-Loss Control Additive and Gel Breaker for Fracturing Fluids," SPE 18211, 1990.
Love et al., "Selectively Placing Many Fractures in Openhole Horizontal Wells Improves Production", SPE 50422, 1998.
McDaniel et al. "Evolving New Stimulation Process Proves Highly Effective In Level 1 Dual-Lateral Completion" SPE 78697, 2002.
Albertsson et al., "Aliphatic Polyesters: Synthesis, Properties and Applications", Advances in Polymer Science, vol. 57 Degradable Aliphatic Polyesters, 2002.
Dechy-Cabaret et al., "Controlled Ring-Operated Polymerization of Lactide and Glycolide" American Chemical Society, Chemical Reviews, A-Z, AA-AD, 2004.

Funkhouser et al., "Synthetic Polymer Fracturing Fluid For High-Temperature Applications", SPE 80236, 2003.
Chelating Agents, Encyclopedia of Chemical Technology, vol. 5 (764-795).
Vichaibun et al., "A New Assay for the Enzymatic Degradation of Polylactic Acid, Short Report", ScienceAsia, vol. 29, pp. 297-300, 2003.
CDX Gas, CDX Solution, 2003 CDX, LLC, Available @ www.cdxgas.com/solution.html, printed pp. 1-2.
CDX Gas, "What is Coalbed Methane?" CDX, LLC. Available @ www.cdxgas.com/what.html, printed p. 1.
Halliburton brochure entitled "H2Zero™ Service Introducing The Next Generation of cost-Effective Conformance Control Solutions", 2002.
Halliburton brochure entitled "INJECTROL® A Component: 1999".
Halliburton brochure entitled "INJECTROL® G Sealant", 1999.
Halliburton brochure entitled "INJECTROL® IT Sealant", 1999.
Halliburton brochure entitled "INJECTROL® Service Treatment", 1999.
Halliburton brochure entitled "INJECTROL® U Sealant", 1999.
Halliburton brochure entitled "Sanfix® A Resin", 1999.
Halliburton brochure entitled "Pillar Frac Stimulation Technique" Fracturing Services Technical Data Sheet, 2 pages.
Foreign search report and opinion (CPW 21582 EP), Mar. 11, 2005.
U.S. Appl. No. 10/649,029, filed Aug. 27, 2003, Nguyen, et al.
U.S. Appl. No. 10/650,063, filed Aug. 26, 2003, Nguyen.
U.S. Appl. No. 10/650,064, filed Aug. 26, 2003, Nguyen, et al.
U.S. Appl. No. 10/650,065, filed Aug. 26, 2003, Nguyen.
U.S. Appl. No. 10/659,574, filed Sep. 10, 2003, Nguyen, et al.
U.S. Appl. No. 10/751,593, filed Jan. 5, 2004, Nguyen.
U.S. Appl. No. 10/775,347, filed Feb. 10, 2004, Nguyen.
U.S. Appl. No. 10/791,944, filed Mar. 3, 2004, Nguyen.
U.S. Appl. No. 10/793,711, filed Mar. 5, 2004, Nguyen, et al.
U.S. Appl. No. 10/852,811, filed May 25, 2004, Nguyen.
U.S. Appl. No. 10/860,951, filed Jun. 4, 2004, Stegent, et al.
U.S. Appl. No. 10/861,829, filed Jun. 4, 2004, Stegent, et al.
U.S. Appl. No. 10/862,986, filed Jun. 8, 2004, Nguyen, et al.
U.S. Appl. No. 10/864,061, filed Jun. 9, 2004, Blauch, et al.
U.S. Appl. No. 10/864,618, filed Jun. 9, 2004, Blauch, et al.
U.S. Appl. No. 10/868,593, filed Jun. 15, 2004, Nguyen, et al.
U.S. Appl. No. 10/868,608, filed Jun. 15, 2004, Nguyen, et al.
U.S. Appl. No. 10/937,076, filed Sep. 9, 2004, Nguyen, et al.
U.S. Appl. No. 10/944,973, filed Sep. 20, 2004, Nguyen, et al.
U.S. Appl. No. 10/972,648, filed Oct. 25, 2004, Dusterhoft, et al.
U.S. Appl. No. 10/977,673, filed Oct. 29, 2004, Nguyen.
U.S. Appl. No. 11/009,277, filed Dec. 8, 2004, Welton, et al.
U.S. Appl. No. 11/011,394, filed Dec. 12, 2004, Nguyen, et al.
U.S. Appl. No. 11/035,833, filed Jan. 14, 2005, Nguyen.
U.S. Appl. No. 11/049,252, filed Feb. 2, 2005, Van Batenburg, et al.
U.S. Appl. No. 11/053,280, filed Feb. 8, 2005, Nguyen.
U.S. Appl. No. 11/056,635, filed Feb. 11, 2005, Dusterhoft, et al.
Halliburton, CoalStim$^{SM}$ Service, Helps Boost Cash Flow From CBM Assets, Stimulation, HO3679 Oct. 3, 2003, Halliburton Communications, 2003.
Halliburton, Conductivity Endurance Technology For High Permeability Reservoirs, Helps Prevent Intrusion of Formation Material Into the Proppant Pack for Improved Long-term Production, Stimulation, 2003, Halliburton Communications, 2003.
Halliburton, Expedite® Service, A Step-Change Improvement Over Conventional Proppant Flowback Control Systems. Provides Up to Three Times the Conductivity of RCPs., Stimulation, HO3296 May 4, 2004, Halliburton Communications, 2004.
Halliburton, SandWedge® NT Conductivity Enhancement System, Enhances Proppant Pack Conductivity and Helps Prevent Intrusion of Formation Material for Improved Long-Term Production, Stimulation, HO2289 May 4, 2004, Halliburton Communications, 2004.
S.W. Almond, et al., "Factors Affecting Proppant Flowback With Resin Coated Proppants," SPE 30096 (1995 European Formation Damage Conference), May 15-16, 1995.

* cited by examiner

METHODS AND COMPOSITIONS FOR CONSOLIDATING PROPPANT IN FRACTURES

CROSS-REFERENCE TO RELATED APPLICATION

This application is a Continuation-in-part Application of commonly owned U.S. patent application Ser. No. 10/383,184, filed Mar. 6, 2003 now abandoned, entitled "Methods and Compositions for Consolidating Proppant in Fractures," by Philip D. Nguyen et al., which is hereby incorporated by reference herein for all purposes

BACKGROUND

The present invention relates to methods and storable hardenable resin compositions for forming one or more fractures in high temperature subterranean zones and consolidating proppant particles therein.

Hydrocarbon producing wells are often stimulated by hydraulic fracturing treatments. In hydraulic fracturing, a viscous fracturing fluid, which also functions as a carrier fluid may be pumped into a subterranean zone to be fractured at a rate and pressure such that one or more fractures are formed in the zone. Proppant particles, e.g., graded sand, for propping the fractures open may be suspended in the fracturing fluid so that the proppant particles are deposited in the fractures when the fracturing fluid is broken. That is, a viscosity breaker may be included in the fracturing fluid so that the fracturing fluid reverts to a thin fluid, which may then be returned to the surface. The proppant particles deposited in the fractures may function to prevent the fractures from closing so that conductive channels are formed through which produced hydrocarbons can readily flow.

To prevent the subsequent flow-back of the proppant particles as well as loose or incompetent fines with fluids produced from the subterranean zone, the proppant particles have heretofore been coated with a hardenable resin composition which is caused to harden and consolidate the proppant particles in the zone into permeable packs. However, when the subterranean zone has a temperature above about 200° F., and it produces hydrocarbons at exceptionally high rates or undergoes reoccurring stresses due to frequent well shutoffs and openings, the hardened resin composition and the permeable proppant particle packs consolidated therewith rapidly deteriorate thus allowing proppant particles and formation fines to flow back with produced formation fluids. The flow-back of the proppant particles and formation fines is detrimental in that it erodes metal goods, plugs piping, and vessels and causes damage to valves, instruments, and other production equipment.

Another problem encountered in the use of prior hardenable resin compositions for coating proppant particles is that the hardenable resin composition or components thereof have had short shelf lives. In addition, the hardenable resin composition components have heretofore had low flash points making them dangerous to use. Also, when the prior hardenable resin compositions or components thereof have been stored at high ambient temperatures, the compositions or components have quickly hardened making them unsuitable for use.

Thus, there are needs for improved methods and storable hardenable resin compositions for consolidating proppant particles in subterranean fractures whereby the permeable packs of consolidated proppant particles formed may be resistant to degradation by high production rates, stress cycling, and/or thermal degradation. Further, there are needs for improved hardenable resin compositions that are pre-mixed and have long shelf lives and high flash points.

SUMMARY

The present invention relates to methods and storable hardenable resin compositions for forming one or more fractures in high temperature subterranean zones and consolidating proppant particles therein.

An example of a method of the present invention for forming one or more fractures in a subterranean zone penetrated by a well bore and consolidating proppant particles therein, the subterranean zone having a temperature above about 200° F. comprises the steps of: providing a hardenable resin composition comprised of a liquid bisphenol A-epichlorohydrin resin, a 4,4'-diaminodiphenyl sulfone hardening agent dissolved in a diethylene glycol monomethyl ether solvent, a silane coupling agent, and a surfactant for facilitating the coating of the resin on the proppant particles; providing proppant particles; coating the proppant particles with the hardenable resin composition; providing a gelled liquid fracturing fluid; mixing the proppant particles with the fracturing fluid so that the proppant particles are suspended therein; introducing the gelled liquid fracturing fluid into the subterranean zone to form the one or more fractures and to deposit the proppant particles therein; and allowing the hardenable resin composition to harden by heat and to consolidate the proppant particles into one or more degradation resistant permeable packs.

Another example of a method of the present invention for forming one or more fractures in a subterranean zone penetrated by a well bore and consolidating proppant particles therein, the subterranean zone having a temperature above about 200° F. comprises the steps of: providing a hardenable resin composition comprised of a liquid bisphenol A-epichlorohydrin resin, a 4,4'-diaminodiphenyl sulfone hardening agent dissolved in a dimethyl sulfoxide solvent, a silane coupling agent, and a surfactant for facilitating the coating of the resin on the proppant particles; providing proppant particles; coating the proppant particles with the hardenable resin composition; providing a gelled liquid fracturing fluid; mixing the proppant particles with the fracturing fluid so that the proppant particles are suspended therein; introducing the gelled liquid fracturing fluid into the subterranean zone to form the one or more fractures and to deposit the proppant particles therein; and allowing the hardenable resin composition to harden by heat and to consolidate the proppant particles into one or more degradation resistant permeable packs.

An example of a hardenable resin composition of the present invention for coating proppant particles comprises a liquid bisphenol A-epichlorohydrin resin; a 4,4-diaminodiphenyl sulfone hardening agent dissolved in a diethylene glycol monomethyl ether solvent; a silane coupling agent; and a surfactant for facilitating the coating of the resin on the proppant particles.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to methods and storable hardenable resin compositions for forming one or more fractures in high temperature subterranean zones and consolidating proppant particles therein.

The present invention provides improved methods of forming one or more fractures in a subterranean zone penetrated by a well bore and consolidating proppant particles therein. In certain embodiments, the methods of the present invention may be especially suited for subterranean zones having a temperature above about 200° F. Improved methods of the present invention may include providing a hardenable resin composition comprised of a liquid bisphenol A-epichlorohydrin resin, a 4,4'-diaminodiphenyl sulfone hardening agent dissolved in a diethylene glycol monomethyl ether solvent, a silane coupling agent, and a surfactant for facilitating the coating of the resin on the proppant particles; providing proppant particles; coating the proppant particles with the hardenable resin composition; providing a gelled liquid fracturing fluid; mixing the proppant particles with the gelled liquid fracturing fluid so that the proppant particles are suspended therein; introducing the gelled liquid fracturing fluid into the subterranean zone to form the one or more fractures and to deposit the proppant particles therein; and allowing the hardenable resin composition to harden by heat and to consolidate the proppant particles into one or more degradation resistant permeable packs. In certain embodiments, a dimethyl sulfoxide solvent may be used instead of or in conjunction with the diethylene glycol monomethyl ether solvent.

Optionally, a hydrolyzable ester for breaking gelled fracturing fluid films on the proppant particles can be included in the hardenable resin composition. A high flash point diluent such as dipropylene glycol methyl ether may also optionally be included in the hardenable resin composition to reduce its viscosity to a desirable level for ease of pumping during operation. A gelled liquid fracturing fluid may also be provided that may be pumped into the subterranean zone to form the one or more fractures and to deposit the proppant particles therein. Proppant particles coated with the hardenable resin composition may be mixed with the fracturing fluid being pumped into the subterranean zone so that the proppant particles coated with the hardenable resin composition are suspended therein. When the proppant particles coated with the hardenable resin composition have been deposited in the one or more fractures, the pumping of the gelled liquid fracturing fluid and the mixing of the proppant particles coated with the hardenable resin composition with the fracturing fluid may be terminated. Thereafter, the hardenable resin composition on the resin composition coated proppant particles may be allowed to harden by heat and to consolidate the proppant particles into one or more high production rate, high stress, and/or high temperature degradation resistant permeable packs.

The diethylene glycol monomethyl ether solvent, which may be used in certain embodiments of the present invention, may offer health and safety advantages over other solvents heretofore used in related applications. Whereas other solvents, such as dimethyl formamide, may pose health and safety risks, such as being readily absorbed into the body through the skin, the diethylene glycol monomethyl ether solvent may pose less of a health and safety hazard, at least from a personnel exposure standpoint.

The proppant particles used in accordance with the present invention are generally of a size such that formation particulate solids that migrate with produced fluids are prevented from being produced from the subterranean zone. Various kinds of proppant particles may be used including graded sand, bauxite, ceramic materials, glass materials, polymer materials, polytetrafluoroethylene materials, nut shell pieces, seed shell pieces, fruit pit pieces, wood, composite particulates, proppant particulates, and combinations thereof. In certain embodiment, the proppant particles may have a size in the range of from about 2 to about 400 mesh, U.S. Sieve Series. The preferred proppant is graded sand, having a particle size in the range of from about 10 to about 70 mesh, U.S. Sieve Series. Preferred sand particle size distribution ranges are one or more of 10-20 mesh, 20-40 mesh, 40-60 mesh, or 50-70 mesh, depending on the particular size and distribution of formation solids to be screened out by the consolidated proppant particles.

Liquid bisphenol A-epichlorohydrin resin is readily available from a number of commercial sources. For example, a suitable such resin is commercially available from Resin Resolution Corporation of Houston, Tex. Upon curing by heat in a subterranean zone, the bisphenol A-epichlorohydrin resin may form an insoluble mass that is highly resistant to high production rate, high stress, and/or high temperature degradation. For example, the cured resin may resist thermal degradation at temperatures up to 400° F. In certain embodiments, bisphenol A-epichlorohydrin resin is present in the hardenable resin composition in an amount in the range of from about 40% to about 65% by weight of the hardenable resin composition, and more preferably in an amount of about 50%.

The liquid hardening agent for hardening the bisphenol A-epichlorohydrin resin at temperatures above about 200° F. may comprise of 4,4'-diaminodiphenyl sulfone dissolved in a dimethyl sulfoxide or a diethylene glycol monomethyl ether solvent and may be present in the hardenable resin composition in an amount in the range of from about 15% to about 50% by weight of the composition, and more preferably, in an amount of about 25%. In certain embodiments, the solvent may contain the 4,4'-diaminodiphenyl sulfone in an amount of about 40% by weight of the solvent.

Examples of silane coupling agents, which may be used in the hardenable resin composition include, but are not limited to, N-2-(aminoethyl)-3-aminopropyltrimethoxysilane, 3-glycidoxypropyltrimethoxysilane, and n-beta-(aminoethyl)-gamma-aminopropyltrimethoxysilane. Of these, n-beta-(aminoethyl)-gamma-aminopropyltrimethoxysilane is preferred. The silane coupling agent is included in the hardenable resin composition in an amount in the range of from about 0.1% to about 3% by weight of the composition and more preferably, in an amount of about 1%.

Various surfactants for facilitating the coating of the resin on the proppant particles and for causing the resin to flow to the contact points between adjacent resin coated proppant particles may be used in the hardenable resin composition. Examples of the surfactants include, but are not limited to, ethoxylated nonyl phenol phosphate ester surfactants, mixtures of one or more cationic surfactants and one or more non-ionic surfactants and a $C_{12}$-$C_{22}$ alkyl phosphonate surfactant. Of these, a $C_{12}$-$C_{22}$ alkyl phosphonate surfactant is preferred. The surfactant may be present in the hardenable resin composition in an amount in the range of from about 0.1% to about 10% by weight of the composition and more preferably, in an amount of about 5%.

Examples of hydrolyzable esters, which may optionally be included in the hardenable resin composition include, but are not limited to, dimethylglutarate, dimethyladipate, dimethylsuccinate, sorbitol, catechol, dimethylthiolate, methyl salicylate, dimethylsuccinate, and terbutylhydroperoxide. Of these, a mixture of dimethylglutarate, dimethyladipate, and dimethylsuccinate is preferred. When used, the hydrolyzable ester may be included in the liquid hardenable resin composition in an amount in the range of from about 0.1% to about 5% by weight of the composition and more preferably in an amount of about 2%.

Dipropylene glycol methyl ether, a high flash point diluent may optionally be included in the hardenable resin composition. When used, the diluent is present in an amount of about 1% to about 40% by weight of the composition.

The liquid hardenable resin composition of the present invention may be premixed and stored at atmospheric conditions, e.g., temperatures up to 120° F. without significant viscosity increase or deterioration. As mentioned above, the liquid hardenable resin composition hardens at temperatures above about 200° F. and may be used in wells having temperatures in the range of from about 200° F. to about 350° F. and higher. The liquid hardenable resin composition has a safe high flash point above 170° F.

Another improved method of forming one or more fractures in a subterranean zone penetrated by a well bore and consolidating proppant particles therein, the subterranean zone having a temperature above about 200° F. is comprised of the following steps. A liquid hardenable resin composition is provided comprised of a liquid bisphenol A-epichlorohydrin resin, a 4,4'-diaminodiphenyl sulfone dissolved in a dimethyl sulfoxide solvent, an n-beta-(aminoethyl)-gamma-aminopropyltrimethoxysilane coupling agent, a $C_{12}$-$C_{22}$ alkyl phosphate surfactant, a mixture of dimethylglutarate, dimethyladipate, and dimethylsuccinate hydrolyzable esters and a dipropylene glycol methyl ether diluent. A source of dry proppant particles and a gelled liquid fracturing fluid may also be provided. The gelled liquid fracturing fluid may comprise water and a gelling agent, the gelling agent being comprised of at least one of the following: guar gum, guar gum derivatives, or cellulose derivatives. In certain embodiments, a diethylene glycol monomethyl ether solvent may be substituted for the dimethyl sulfoxide solvent. The gelled liquid fracturing fluid may be pumped into the subterranean formation to form the one or more fractures therein and to place the proppant particles therein. The hardenable resin composition may be coated onto the dry proppant particles conveyed from the source thereof to form hardenable resin composition coated proppant particles. The hardenable resin composition coated proppant particles may be mixed with the fracturing fluid being pumped so that the hardenable resin composition coated proppant particles may be suspended therein. When the hardenable resin composition coated proppant particles have been placed in the one or more fractures by the fracturing fluid, the pumping of the fracturing fluid, the coating of the hardenable resin composition onto the dry proppant particles, and the mixing of the hardenable resin composition coated proppant particles formed with the fracturing fluid may be terminated. Thereafter, the hardenable resin composition on the hardenable resin composition coated proppant particles may be allowed to harden by heat and consolidate the proppant particles into one or more high production rate, high stress, and/or high temperature degradation resistant permeable packs.

The bisphenol A-epichlorohydrin resin, the 4,4'-diaminodiphenyl sulfone hardening agent dissolved in a dimethyl sulfoxide solvent, the silane coupling agent, the surfactant, the hydrolyzable esters, and the dipropylene glycol methyl ether diluent may be present in the hardenable resin composition in the same amounts as described above.

The water in the gelled liquid fracturing fluid may include fresh water or salt water. The term "salt water" as used herein means unsaturated salt solutions and saturated salt solutions including brines and seawater.

In certain embodiments, the gelling agent in the fracturing fluid is generally present in an amount in the range of from about 0.01% to about 3% by weight of water therein and more preferably, in an amount of about 0.1% to about 1%.

The gelled liquid fracturing fluid may include a cross-linking agent for increasing the viscosity of the fracturing fluid. Examples of suitable cross-linking agents include, but are not limited to, alkali metal borates, borax, boric acid, and compounds capable of releasing multivalent metal ions in aqueous solutions. When used, the cross-linking agent may be included in the fracturing fluid in an amount in the range of from about 0.001% to about 5% by weight of water therein and more preferably, in an amount of about 0.01% to about 1%.

The fracturing fluid may also include a delayed viscosity breaker, which may function to reduce the viscosity of the fracturing fluid and may cause the resin composition coated proppant particles suspended in the fracturing fluid to be deposited in the fractures. Examples of delayed viscosity breakers that may be used include, but are not limited to, alkali metal and ammonium persulfates, which may be delayed by being encapsulated in a material that slowly releases the breaker, alkali metal chlorites, alkali metal hypochlorites, and calcium hypochlorite. When used, the delayed viscosity breaker may be included in the fracturing fluid in an amount in the range of from about 0.1% to about 5% by weight of water therein.

A preferred method of the present invention for forming one or more fractures in a subterranean zone penetrated by a well bore and consolidating proppant particles therein, the subterranean zone having a temperature above about 200° F. comprises the steps of: (a) providing proppant particles coated with a hardenable resin composition comprised of a liquid bisphenol A-epichlorohydrin resin, a 4,4'-diaminodiphenyl sulfone hardening agent dissolved in a diethylene glycol monomethyl ether solvent, a silane coupling agent and a surfactant for facilitating the coating of the resin on the proppant particles and for causing the resin to flow to the contact points between adjacent resin coated proppant particles; (b) providing a gelled liquid fracturing fluid; (c) pumping the gelled liquid fracturing fluid into the subterranean zone to form the one or more fractures and to deposit the proppant particles therein; (d) mixing the proppant particles coated with the hardenable resin composition with the fracturing fluid pumped in accordance with step (c) so that the proppant particles coated with the hardenable resin composition are suspended therein; (e) terminating steps (c) and (d) when the proppant particles coated with the hardenable resin composition have been deposited in the one or more fractures; and (f) allowing the hardenable resin composition on the resin composition coated proppant particles to harden by heat and consolidate the proppant particles into one or more degradation resistant permeable packs. As a person of ordinary skill in the art would recognize, the coating of the proppant particles may only coat a portion of the proppant particles with the hardenable resin composition, and some of the proppant particles so coated may, in certain embodiments, be only partially coated.

Another improved method of the present invention for forming one or more fractures in a subterranean zone penetrated by a well bore and consolidating proppant particles therein, the subterranean zone having a temperature above about 200° F. comprises the steps of: (a) providing a liquid hardenable resin composition comprised of a liquid bisphenol A-epichlorohydrin resin, a 4,4'-diaminodiphenyl sulfone hardening agent dissolved in a diethylene glycol monomethyl ether solvent, an n-beta-(aminoethyl)-gamma-aminopropyltrimethoxysilane coupling agent, a $C_{12}$-$C_{22}$ alkyl phosphate surfactant, a mixture of dimethyladipate and dimethylsuccinate hydrolyzable esters and a dipropylene glycol methyl ether diluent; (b) providing a source of dry proppant particles; (c) providing a gelled liquid fracturing fluid comprised of water and a gelling agent; (d) pumping the gelled liquid fracturing fluid into the subterranean zone to form the one or more fractures therein and to place the proppant particles therein; (e) coating the hardenable resin composition onto the dry proppant particles conveyed from the source thereof to form hardenable resin composition coated proppant particles; (f) mixing the hardenable resin composition coated proppant particles formed in step (e) with the fracturing fluid pumped in accordance with step (d) whereby the hardenable resin composition coated proppant particles are suspended therein; (g) terminating steps (d), (e) and (f) when the hardenable resin composition coated proppant particles have been placed in the one or more fractures; and (h) allowing the hardenable resin composition on the hardenable resin composition coated proppant particles to harden by heat and consolidate the proppant particles into one or more degradation resistant permeable packs.

A hardenable resin composition of this invention for coating proppant particles may comprise: a hardenable resin comprised of a liquid bisphenol A-epichlorohydrin resin; a 4,4'-diaminodiphenyl sulfone hardening agent dissolved in a diethylene glycol monomethyl ether solvent; a silane coupling agent; and a surfactant for facilitating the coating of the resin on the proppant particles. Optionally, in certain embodiments, a dimethyl sulfoxide solvent may be used instead of the diethylene glycol monomethyl ether solvent.

To facilitate a better understanding of the present invention, the following examples of certain aspects of some embodiments are given. In no way should the following examples be read to limit, or define, the scope of the invention.

EXAMPLE 1

The effect of time and temperature on the viscosity of a hardenable resin composition of this invention was determined. A hardenable resin composition was prepared comprised of a liquid bisphenol A-epichlorohydrin resin present in an amount of 49% by weight of the composition, a 4,4'-diaminodiphenyl sulfone hardening agent dissolved in a dimethyl sulfoxide solvent present in an amount of about 35% by weight of the composition, an n-beta-(aminoethyl)-gamma-aminopropyltrimethoxysilane coupling agent present in an amount of about 1% by weight of the composition, a $C_{12}$-$C_{22}$ alkyl phosphate surfactant present in an amount of about 4% by weight of the composition, and a mixture of dimethylglutarate, dimethyladipate, and dimethylsuccinate esters present in an amount of about 1% by weight of the composition, and a diluent of dipropylene glycol methyl ether in an amount of about 10% by weight of the composition.

Samples of the hardenable resin composition were exposed to room temperature for eleven days and were maintained in a water bath at a temperature of 120° F. for eleven days. The samples had viscosities between 1,100 and 1300 centipoises, which is a desirable viscosity level for coating the resin onto proppant particles.

EXAMPLE 2

One of the hardenable resin composition samples described in Example 1 above was coated onto dry 20/40 mesh bauxite proppant particles in an amount of 3% by weight of the proppant. The resin coated proppant was mixed with water gelled with carboxymethylhydroxypropyl guar and cross-linked with a zirconium cross-linker. Two portions of the resulting viscous fluid containing hardenable resin composition coated proppant particles were stirred for 1 hour at 175° F. to simulate the effect of pumping and fluid suspension during a fracturing treatment. The fluids were then transferred and packed into brass flow cells without stress simulating fracture closure pressure. One of the resulting proppant particle packs was cured at a temperature of 325° F. for 3 hours and the other was cured at the same temperature for 72 hours. Consolidated cores were obtained from the proppant packs formed and the cores were tested for unconfined compressive strengths.

The consolidated core that was cured for 3 hours had an unconfined compressive strength of 1304±108 psi and the consolidated core that was cured for 72 hours had an unconfined compressive strength of 1230±47 psi.

EXAMPLE 3

A hardenable resin composition was prepared comprised of a liquid bisphenol A-epichlorohydrin resin present in an amount of 49% by weight of the composition, a 4,4'-diaminodiphenyl sulfone hardening agent in an amount of 20% by weight of the composition dissolved in a diethylene glycol monomethyl ether solvent present in an amount of about 25% by weight of the composition, an n-beta-(aminoethyl)-gamma-aminopropyltrimethoxysilane coupling agent present in an amount of about 1% by weight of the composition, a $C_{12}$-$C_{22}$ alkyl phosphate surfactant present in an amount of about 4% by weight of the composition, and a mixture of dimethylglutarate, dimethyladipate, and dimethylsuccinate esters present in an amount of about 1% by weight of the composition.

The hardenable resin composition was coated onto dry 20/40 mesh bauxite proppant particles in an amount of 1, 2, or 3% by weight of the proppant. The resin coated proppant was then mixed with water gelled with carboxymethylhydroxypropyl guar and cross-linked with a zirconium cross-linker. The resulting viscous slurry containing hardenable resin composition coated proppant particles were stirred for 1 hour at 175° F. to simulate the effect of pumping and fluid suspension during a fracturing treatment. The slurry was then transferred and packed into brass flow cells without stress applied onto the proppant pack during curing. The proppant packs chamber were placed in oven and cured at temperature for 20 hours.

After curing, consolidated proppant packs were extruded from the brass chamber. Cores of desired length were obtained before being subjecting to unconfined compressive strength (UCS) requirements. Table 1 shows the UCS values of proppant packs that were treated with the hardenable resin system at different resin concentrations and cure temperatures.

TABLE 1

| Resin Conc. (%) | Unconfined Compressive Strength (psi) at Indicated Cure Temperatures | | |
|---|---|---|---|
| | 225° F. | 300° F. | 350° F. |
| 1 | 265 | 194 | 235 |
| 2 | 747 | 588 | 450 |
| 3 | 1692 | 756 | 524 |

Thus the results of the tests described in Examples 1-3 above show the efficacy of certain hardenable resin compositions of the present invention.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. An improved method of forming one or more fractures in a subterranean zone penetrated by a well bore and consolidating proppant particles therein, the subterranean zone having a temperature above about 200° F. comprising the steps of:
   providing a hardenable resin composition comprised of a liquid bisphenol A-epichlorohydrin resin, a 4,4'-diaminodiphenyl sulfone hardening agent dissolved in a diethylene glycol monomethyl ether solvent, a silane coupling agent, and a surfactant for facilitating the coating of the resin on the proppant particles;
   providing proppant particles;
   coating the proppant particles with the hardenable resin composition;
   providing a gelled liquid fracturing fluid;
   mixing the proppant particles with the gelled liquid fracturing fluid so that the proppant particles are suspended therein;
   introducing the gelled liquid fracturing fluid into the subterranean zone to form the one or more fractures and to deposit the proppant particles therein; and
   allowing the hardenable resin composition to harden by heat and to consolidate the proppant particles into one or more degradation resistant permeable packs.

2. The method of claim 1 wherein the liquid bisphenol A-epichlorohydrin resin is present in the hardenable resin composition in an amount in the range of from about 40% to about 65% by weight of the hardenable resin composition.

3. The method of claim 1 wherein the 4,4'-diaminodiphenyl sulfone hardening agent dissolved in the diethylene glycol monomethyl ether solvent is present in the hardenable resin composition in an amount in the range of from about 15% to about 50% by weight of the hardenable resin composition.

4. The method of claim 1 wherein the silane coupling agent in the hardenable resin composition is selected from the group consisting of: N-2-(aminoethyl)-3-aminopropyltrimethoxysilane, 3-glycidoxypropyltrimethoxysilane, and n-beta-(aminoethyl)-gamma-aminopropyltrimethoxysilane.

5. The method of claim 1 wherein the silane coupling agent is present in the hardenable resin composition in an amount in the range of from about 0.1% to about 3% by weight of the hardenable resin composition.

6. The method of claim 1 wherein hardenable resin surfactant for facilitating the coating of the hardenable resin on the proppant particles is selected from the group consisting of: an ethoxylated nonyl phenol phosphate ester, mixtures of one or more cationic surfactants and one or more non-ionic surfactants, and a $C_{12}$-$C_{22}$ alkyl phosphonate surfactant.

7. The method of claim 1 wherein the surfactant is a $C_{12}$-$C_{22}$ alkyl phosphonate surfactant.

8. The method of claim 1 wherein the surfactant is present in the hardenable resin composition in an amount in the range of from about 0.1% to about 10% by weight of the hardenable resin composition.

9. The method of claim 1 wherein the hardenable resin composition further comprises a hydrolyzable ester for breaking gelled fracturing fluid films on the proppant particles.

10. The method of claim 9 wherein the hydrolyzable ester is selected from the group consisting of: dimethylglutarate, dimethyladipate, dimethylsuccinate, sorbitol, catechol, dimethylthiolate, methyl salicylate, dimethylsuccinate, and terbutylhydroperoxide.

11. The method of claim 9 wherein the hydrolyzable ester is present in the hardenable resin composition in an amount in the range of from about 0.1% to about 5%.

12. The method of claim 1 further comprising a high flash point diluent for reducing the viscosity of the hardenable resin composition.

13. The method of claim 12 wherein the high flash point diluent comprises dipropylene glycol methyl ether.

14. The method of claim 12 wherein the high flash point diluent is present in the hardenable resin composition in an amount in the range of from about 1% to about 40% by weight of the hardenable resin composition.

15. An improved method of forming one or more fractures in a subterranean zone penetrated by a well bore and consolidating proppant particles therein, the subterranean zone having a temperature above about 200°F comprising the steps of:
   providing a hardenable resin composition comprised of a liquid bisphenol A-epichlorohydrin resin, a 4,4'-diaminodiphenyl sulfone hardening agent dissolved in a dimethyl sulfoxide solvent, a silane coupling agent, and a surfactant for facilitating the coating of the resin on the proppant particles;
   providing proppant particles;
   coating the proppant particles with the hardenable resin composition;
   providing a gelled liquid fracturing fluid;
   mixing the proppant particles with the gelled liquid fracturing fluid so that the proppant particles are suspended therein;
   introducing the gelled liquid fracturing fluid into the subterranean zone to form the one or more fractures and to deposit the proppant particles therein; and
   allowing the hardenable resin composition to harden by heat and to consolidate the proppant particles into one or more degradation resistant permeable packs.

* * * * *